(12) United States Patent
Hyde et al.

(10) Patent No.: US 8,240,569 B2
(45) Date of Patent: Aug. 14, 2012

(54) IMAGING ENGINE WITH INDEPENDENTLY ADJUSTABLE LENS CARRIAGES

(75) Inventors: Ryan Hyde, Lehi, UT (US); Frank Clegg, Fruitheights, UT (US); Randy Nate, Orem, UT (US)

(73) Assignee: The Code Corporation, Bluffdale, UT (US)

( * ) Notice: Subject to any disclaimer, the term of this patent is extended or adjusted under 35 U.S.C. 154(b) by 151 days.

(21) Appl. No.: 12/697,902

(22) Filed: Feb. 1, 2010

(65) Prior Publication Data

US 2011/0186635 A1 Aug. 4, 2011

(51) Int. Cl.
*G06K 7/14* (2006.01)
(52) U.S. Cl. ........................................ 235/454
(58) Field of Classification Search ................ 235/454; 359/680

See application file for complete search history.

(56) References Cited

U.S. PATENT DOCUMENTS

| 7,014,113 | B1 | 3/2006 | Powell et al. |
| 7,270,274 | B2 | 9/2007 | Hennick et al. |
| 2003/0080189 | A1* | 5/2003 | Patel et al. ............ 235/454 |
| 2006/0056045 | A1* | 3/2006 | Yoshitsugu ............ 359/680 |

* cited by examiner

*Primary Examiner* — Kristy A Haupt

(57) ABSTRACT

An imaging engine in accordance with the present disclosure includes a first image sensor section, a second image sensor section, an optics barrel, a first lens carriage that includes at least one lens, and a second lens carriage that includes at least one lens. The first lens carriage is positioned within the optics barrel so that there is a first optical path through the lens(es) in the first lens carriage to the first image sensor section. Similarly, the second lens carriage is positioned within the optics barrel so that there is a second optical path through the lens(es) in the second lens carriage to the second image sensor section. Advantageously, the position of the first lens carriage within the optics barrel and the position of the second lens carriage within the optics barrel are both independently adjustable.

16 Claims, 8 Drawing Sheets

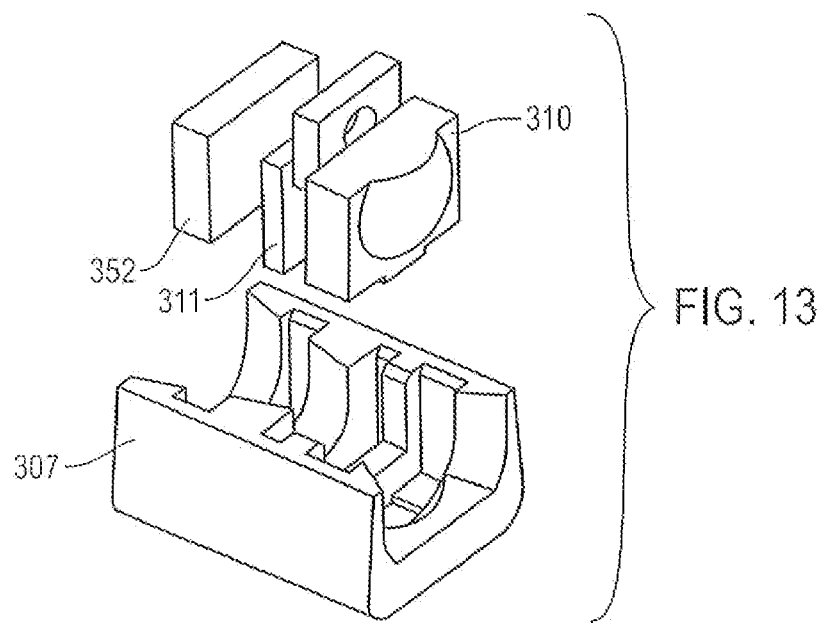
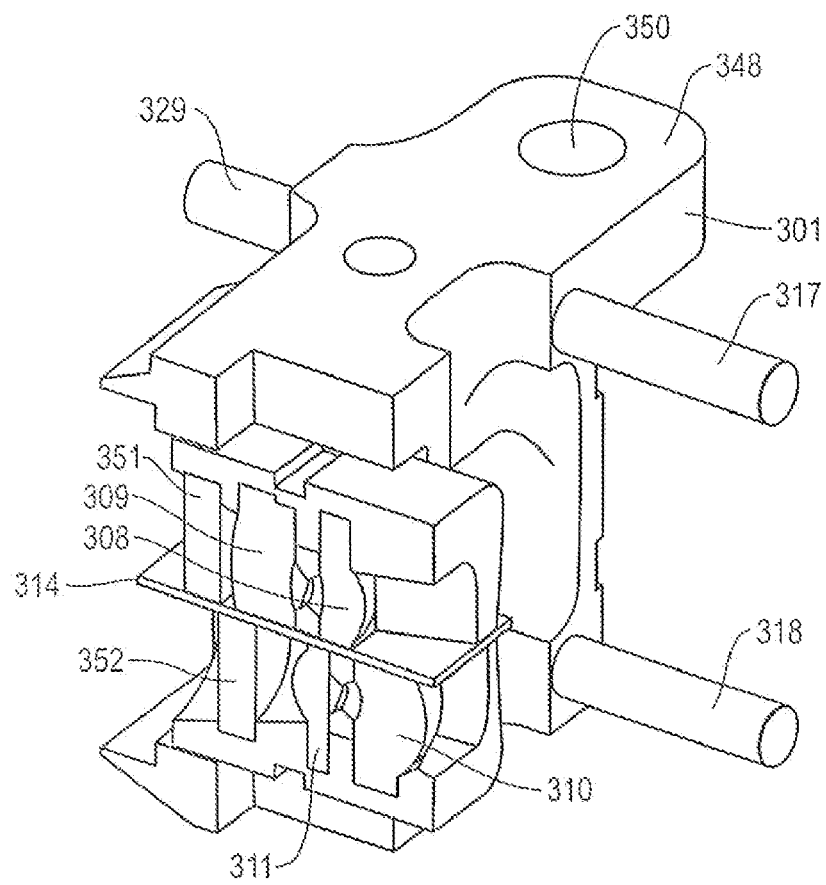

IMAGING ENGINE WITH INDEPENDENTLY ADJUSTABLE LENS CARRIAGES

BACKGROUND

A machine-readable graphical code ("graphical code") is a graphical representation of information that consists of multiple graphical code elements having different light reflective or light emissive properties. Examples of different types of graphical codes include bar codes, data matrix codes, Maxi-Codes, and so forth. Graphical codes and graphical code readers have become widely used in many commercial environments, such as point-of-sale stations in retail stores and supermarkets, inventory and document tracking, and the like.

Devices for identifying or extracting information from graphical codes are generally referred to as graphical code readers. Some graphical code readers include an imaging engine. During typical operation, one or more light sources within the imaging engine illuminate a target area in which a graphical code may be located. Light is reflected from the graphical code toward the graphical code reader. One or more lenses within the imaging engine focus an image of the graphical code onto an image sensor. Pixels within the image sensor are read electronically to provide a two-dimensional array of image data corresponding to the graphical code. A decoder then processes the image data and extracts the information that is contained in the graphical code.

The present disclosure relates generally to an imaging engine for a graphical code reader.

BRIEF DESCRIPTION OF THE DRAWINGS

FIGS. 9-14 illustrate an alternative imaging engine.

DETAILED DESCRIPTION

Figure 1:
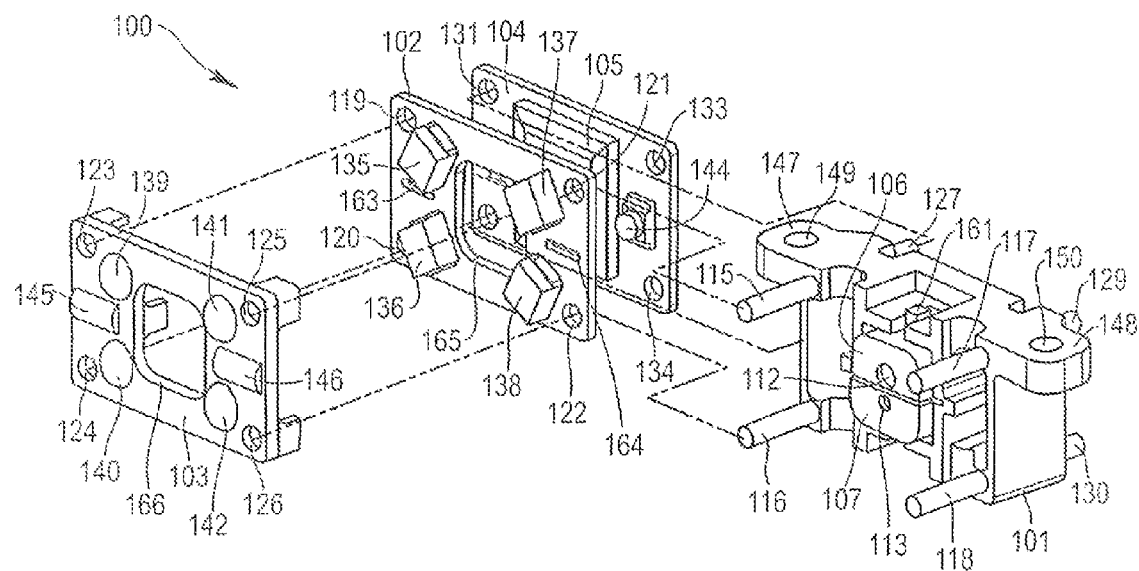
FIG. 1 is an exploded perspective view of an imaging engine in accordance with the present disclosure.

Reference is initially made to FIG. 1, which is an exploded perspective view of an imaging engine 100 in accordance with the present disclosure. The imaging engine 100 includes an optics barrel 101. The optics barrel 101 is a single structure that may be formed via injection molding.

An illumination board 102 and an illumination/targeting lens structure 103 may be attached to one side of the optics barrel 101. An image sensor board 104, with an image sensor 105 attached thereto, may be attached to the opposite side of the optics barrel 101. The image sensor 105 is a solid-state photodetecting device containing a relatively large number of light-sensitive pixels that are arranged in horizontal rows and vertical columns. The pixels may be read electronically to provide a two-dimensional array of pixel information.

The imaging engine 100 also includes a first lens carriage 106 and a second lens carriage 107. The first lens carriage 106 includes two lenses 108, 109 (shown in FIG. 2). The second lens carriage 107 also includes two lenses 110, 111 (also shown in FIG. 2). Two lenses may be used in each lens carriage in order to get the optical performance that is desired. Some optical prescriptions cannot be easily accomplished with only one lens. However, in an alternative imaging engine, a different number of lenses may be used in each lens carriage (e.g., only a single lens, or more than two lenses).

Figure 7:
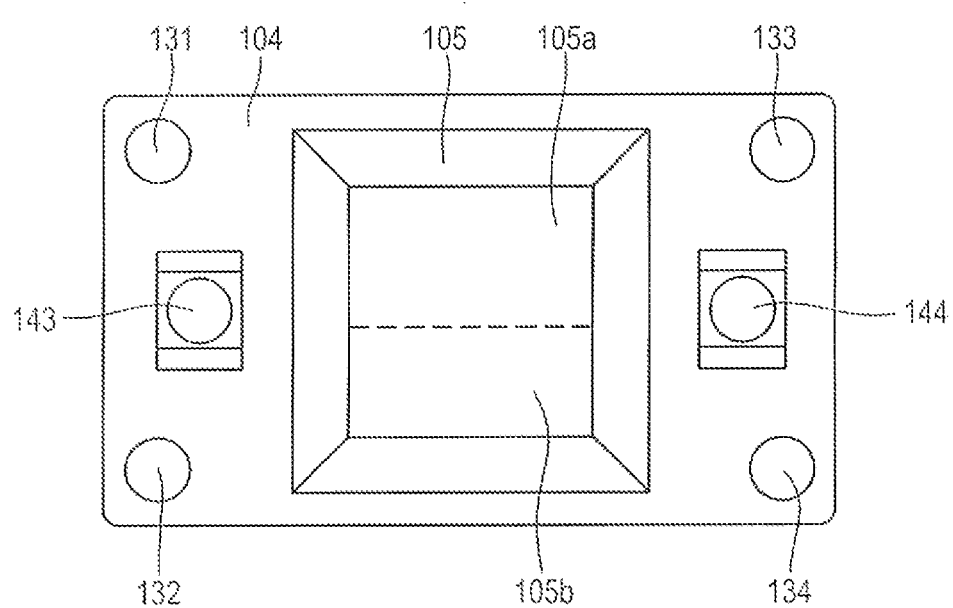
FIG. 7 is a front view of the image sensor board from the imaging engine.

The first lens carriage 106 is positioned within the optics barrel 101 so that there is a first optical path through the lenses 108, 109 in the first lens carriage 106 to a first section 105a of the image sensor 105. Similarly, the second lens carriage 107 is positioned within the optics barrel 101 so that there is a second optical path through the lenses 110, 111 in the second lens carriage 107 to a second section 105b of the image sensor 105. (The first section 105a and the second section 105b of the image sensor 105 are shown in FIG. 7.) The first lens carriage 106 includes an aperture 112 for allowing light to enter the first optical path, and the second lens carriage 107 also includes an aperture 113 for allowing light to enter the second optical path. A baffle 114 (shown in FIG. 2) separates the first optical path from the second optical path. The illumination board 102 includes a rectangular opening 165, and the illumination/targeting lens structure 103 also includes a rectangular opening 166. These rectangular openings 165, 166 permit light to enter the first and second optical paths.

The imaging engine 100 may be utilized in a graphical code reader (not shown). When the graphical code reader is used to read a graphical code, the lenses 108, 109 in the first lens carriage 106 focus a first image of the graphical code (not shown) onto the first section 105a of the image sensor 105 via the first optical path. Similarly, the lenses 110, 111 in the second lens carriage 107 focus a second image of the graphical code onto a second section 105b of the image sensor 105 via the second optical path.

One characteristic of a graphical code is its size. Different types of graphical codes come in different sizes. Another characteristic of a graphical code is the feature size of each element within the graphical code. Different types of graphical codes include different sizes of graphical code elements. As used herein, the term "high-density graphical code" refers to a graphical code for which the feature size of each element within the code is relatively small. Conversely, the term "low-density graphical code" refers to a graphical code for which the feature size of each element within the code is relatively large.

Decoding algorithms typically need a minimum number of pixels-per-feature in order to successfully decode a graphical code. Therefore, when a high-density graphical code is being read, the pixels of the image sensor 105 may be focused down to a smaller area of the graphical code (i.e., a narrow field of view may be utilized) in order to increase the number of pixels-per-feature. When a low-density graphical code is being read, the pixels of the image sensor 105 may be focused over a larger area of the graphical code (i.e., a wider field of view may be utilized).

The lenses 108, 109 in the first lens carriage 106 have different optical characteristics than the lenses 110, 111 in the second lens carriage 107. The lenses 108, 109 in the first lens carriage 106 are optimized for reading small, high-density graphical codes that require only a narrow field of view. Thus, the first optical path (which, as indicated above, passes through the lenses 108, 109 in the first lens carriage 106 to a first section 105a of the image sensor 105) will be referred to herein as a high-density optical path. The lenses 110, 111 in the second lens carriage 107 are optimized for reading larger, lower density graphical codes that require a wider field of view. Thus, the second optical path (which, as indicated above, passes through the lenses 110, 111 in the second lens carriage 107 to a second section of the image sensor 105*b*) will be referred to as a wide-field optical path. The images that are produced via the high-density optical path have a higher resolution than the images that are produced via the wide-field optical path. Conversely, the images that are produced via the wide-field optical path have a wider field of view than the images that are produced via the high-density optical path.

The lenses 108, 109, 110, 111 in the first and second lens carriages 106, 107 are fixed-focus lenses, meaning that the focus of these lenses is set at some point (typically at the time of manufacture) and remains fixed. The position of the first lens carriage 106 within the optics barrel 101 and the position of the second lens carriage 107 within the optics barrel 101 are both independently adjustable. In other words, the first lens carriage 106 and the second lens carriage 107 can be positioned within the optics barrel 101 so that the distance between the first lens carriage 106 and the first section 105*a* of the image sensor 105 is different than the distance between the second lens carriage 107 and the second section 105*b* of the image sensor 105. Thus, the lenses 108, 109 in the first lens carriage 106 can be focused independently of the lenses 110, 111 in the second lens carriage 107.

Figure 4:
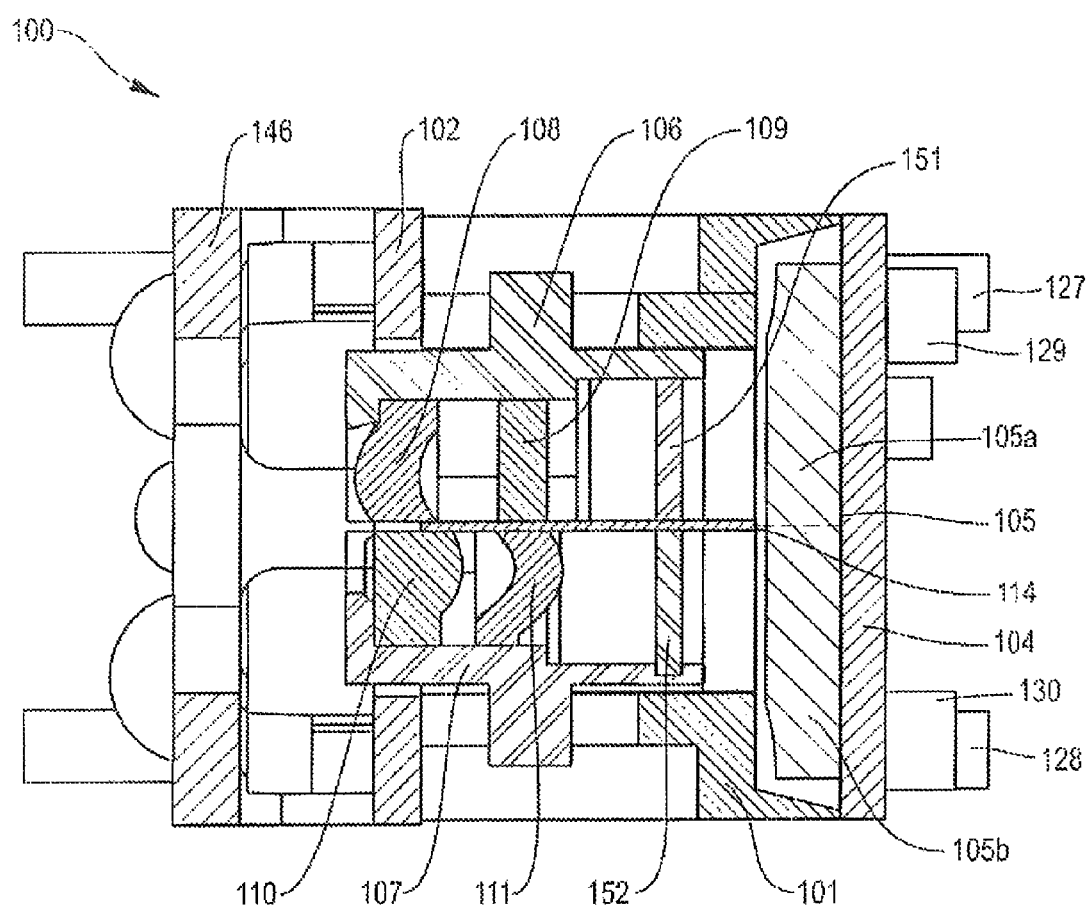
FIG. 4 is a cross-sectional view of the imaging engine.

The optics barrel 101 includes four support posts 115, 116, 117, 118 to which the illumination board 102 and the illumination/targeting lens structure 103 may be attached. The support posts 115, 116, 117, 118 on the optics barrel 101 may be inserted through holes 119, 120, 121, 122 in the illumination board 102 and holes 123, 124, 125, 126 in the illumination/targeting lens structure 103. The optics barrel 101 also includes four support posts 127, 128, 129, 130 to which the image sensor board 104 may be attached. (One support post 128 of these four support posts 127, 128, 129, 130 is not shown in FIG. 1, but is shown in FIG. 4.) These support posts 127, 128, 129, 130 may be inserted through holes 131, 132, 133, 134 in the image sensor board 104. (One hole 132 of these four holes 131, 132, 133, 134 is not shown in FIG. 1, but is shown in FIG. 7.)

The illumination board 102 includes four light-emitting diodes (LEDs) 135, 136, 137, 138. These LEDs 135, 136, 137, 138 may be used to illuminate a target area in which a graphical code is located. Lenses 139, 140, 141, 142 on the illumination/targeting lens structure 103 focus the illumination from the LEDs 135, 136, 137, 138 onto the target area.

The image sensor board 104 includes two targeting light sources 143, 144. (One targeting light source 143 of these targeting light sources 143, 144 is not shown in FIG. 1, but is shown in FIG. 7.) Targeting lenses 145, 146 on the illumination/targeting lens structure 103 focus the light from the targeting light sources 143, 144 onto the target area. The illumination board 102 includes apertures 163, 164 that permit light from the targeting light sources 143, 144 to pass through to the targeting lenses 145, 146.

The optics barrel 101 includes a first mounting tab 147 and a second mounting tab 148. A first mounting hole 149 extends through the first mounting tab 147, and a second mounting hole 150 extends through the second mounting tab 148. These mounting holes 149, 150 may be used to attach the imaging engine 100 to another structure, such as the housing of a graphical code reader.

Figure 2:
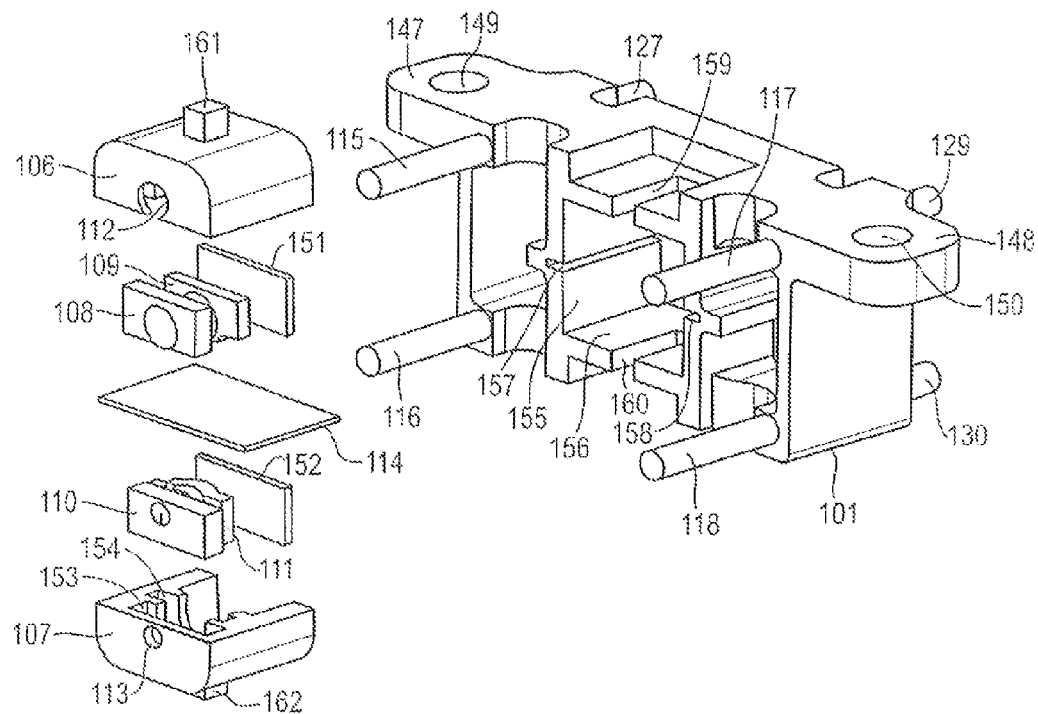
FIG. 2 is an exploded perspective view of the optics barrel from the imaging engine.

Reference is now made to FIG. 2, which is an exploded perspective view of the optics barrel 101. The first lens carriage 106 (i.e., the lens carriage 106 that is utilized in the high-density optical path) and the second lens carriage 107 (i.e., the lens carriage 107 that is utilized in the wide-field optical path) are shown outside of the optics barrel 101. The lenses 108, 109 that are held by the first lens carriage 106 and the lenses 110, 111 that are held by the second lens carriage 107 are also shown. The lenses 108, 109 that are held by the first lens carriage 106 will be referred to as a high-density far lens 108 and a high-density near lens 109, respectively. The lenses 110, 111 that are held by the second lens carriage 107 will be referred to as a wide-field far lens 110 and a wide-field near lens 111, respectively. The baffle 114 that separates the high-density optical path from the wide-field optical path is also shown.

Filters 151, 152 for the high-density optical path and the wide-field optical path, respectively, are also shown. These filters 151, 152 will be referred to herein as a high-density path filter 151 and a wide-field path filter 152, respectively. The filters 151, 152 are used to remove unwanted frequencies of light that may degrade the quality of the images that are focused on the image sensor 105.

As shown in FIG. 2, the second lens carriage 107 includes first and second openings 153, 154 for the wide-field far lens 110 and the wide-field near lens 111, respectively. The first lens carriage 106 includes similar openings for the high-density far lens 108 and the high-density near lens 109, although these openings are not shown in FIG. 2. The wide-field far lens 110 is keyed to the first opening 153, such that the wide-field far lens 110 fits into in the first opening 153 but not into the second opening 154. Similarly, the wide-field near lens 111 is keyed to the second opening 154, such that the wide-field near lens 111 fits into the second opening 154 but not into the first opening 153. This way, it is difficult (if not impossible) for the lenses 110, 111 to be inserted into the wrong position in the lens carriage 107. The high-density far lens 108 and the high-density near lens 109 are similarly keyed to the openings in the first lens carriage 106.

The optics barrel 101 includes a rectangular cavity that is dimensioned so that the lens carriages 106, 107 may be inserted into the rectangular cavity. This rectangular cavity is defined by four walls. Two of these walls—namely, a first side wall 155 and a lower wall 156—are visible in FIG. 2. There is a groove 157 in the first side wall 155, and a corresponding groove 158 in a second side wall (which is not visible in FIG. 2) that is opposite the first side wall 155. The first groove 157 and the second groove 158 are positioned at substantially the same height in the first side wall 155 and the second side wall, respectively. Notches 159, 160 are provided in the upper wall and the lower wall 156 of the rectangular cavity.

Figure 3:
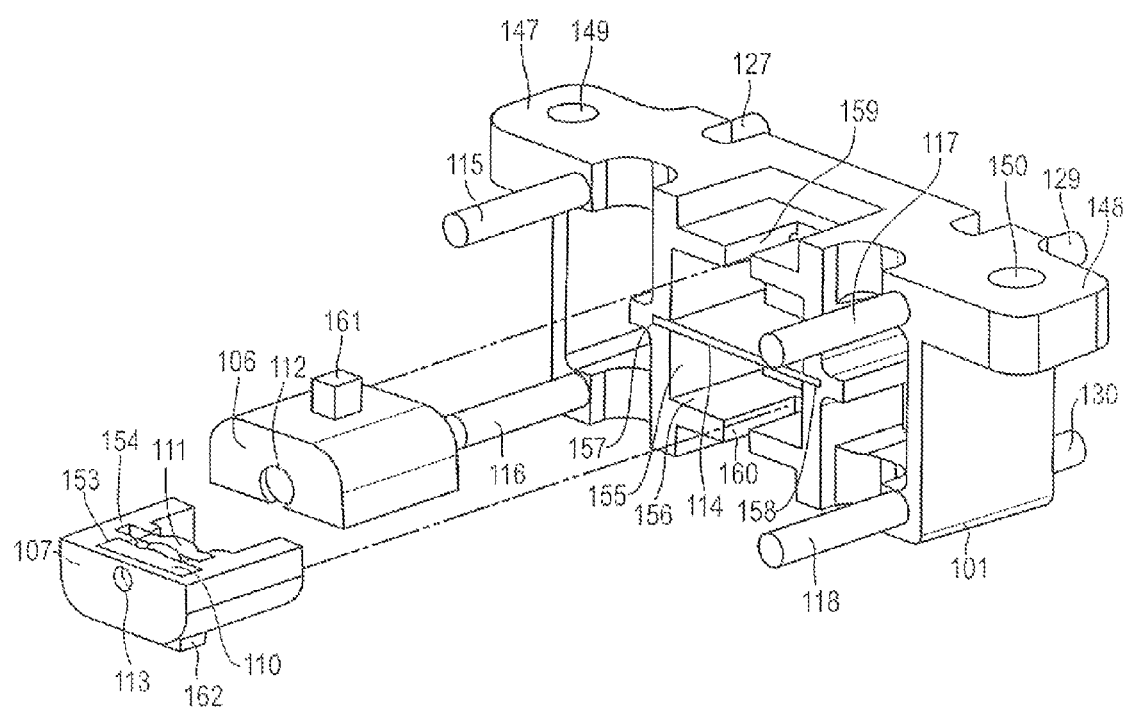
FIG. 3 is a partially exploded perspective view of the optics barrel.

Reference is now made to FIG. 3, which is a partially exploded perspective view of the optics barrel 101. During assembly, the baffle 114 is inserted into the grooves 157, 158. The high-density path filter 151 is inserted into the upper portion of the rectangular cavity (i.e., the portion that is above the baffle 114). The high-density far lens 108 and the high-density near lens 109 are inserted into the first lens carriage 106, and the first lens carriage 106 is inserted into the upper portion of the rectangular cavity. A projection 161 on the top of the first lens carriage 106 fits within the notch 159 in the upper wall of the rectangular cavity. Similarly, the wide-field path filter 152 is inserted into the lower portion of the rectangular cavity (i.e., the portion that is below the baffle 114). The wide-field far lens 110 and the wide-field near lens 111 are inserted into the second lens carriage 107, and the second lens carriage 107 is inserted into the lower portion of the rectangular cavity. A projection 162 on the bottom of the second lens carriage fits within the notch 160 in the lower wall 156 of the rectangular cavity.

The lens carriages 106, 107 may be moved within the rectangular cavity of the optics barrel 101 until the lenses 108, 109, 110, 111 are in the correct position. As indicated above, the position of the first lens carriage 106 within the optics barrel 101 and the position of the second lens carriage 107 within the optics barrel 101 are both independently adjustable. In other words, the first lens carriage 106 (which holds the lenses 108, 109 for the high-density optical path) may be moved independently of the second lens carriage 107 (which holds the lenses 110, 111 for the wide-field optical path). This is significant because the lenses 108, 109 for the high-density optical path may need to be positioned differently than the lenses 110, 111 for the wide-field optical path.

The lens carriages 106, 107 are independently slidable within the optics barrel 101. Movement of the first lens carriage 106 may be accomplished by gripping the projection 161 that is located on the top of the first lens carriage 106 and then sliding the first lens carriage 106 in the desired direction. Similarly, movement of the second lens carriage 107 may be accomplished by gripping the projection 162 that is located on the bottom of the second lens carriage 107 and then sliding the second lens carriage 107 in the desired direction. When the first lens carriage 106 and the second lens carriage 107 are in the desired positions in the rectangular cavity of the optics barrel 101, they may be permanently attached to the optics barrel 101 by a suitable attachment mechanism, such as heat staking, gluing (e.g., with UV-cured glue), etc.

Reference is now made to FIG. 4, which is a cross-sectional view of the imaging engine 100. The image sensor board 104 (which includes the image sensor 105), the illumination/targeting structure 103, and the illumination board 102 are attached to the optics barrel 101. The first and second lens carriages 106, 107 are positioned within the optics barrel 101. The first lens carriage 106 holds the high-density far lens 108 and the high-density near lens 109. The second lens carriage 107 holds the wide-field far lens 110 and the wide-field near lens 111. The filter 151 for the high-density optical path is shown positioned between the first lens carriage 106 and the first section 105a of the image sensor 105. Similarly, the filter 152 for the wide-field optical path is shown positioned between the second lens carriage 107 and the second section 105b of the image sensor. The baffle 114 separating the high-density optical path and the wide-field optical path is also shown in FIG. 4.

Figures 5, 6:
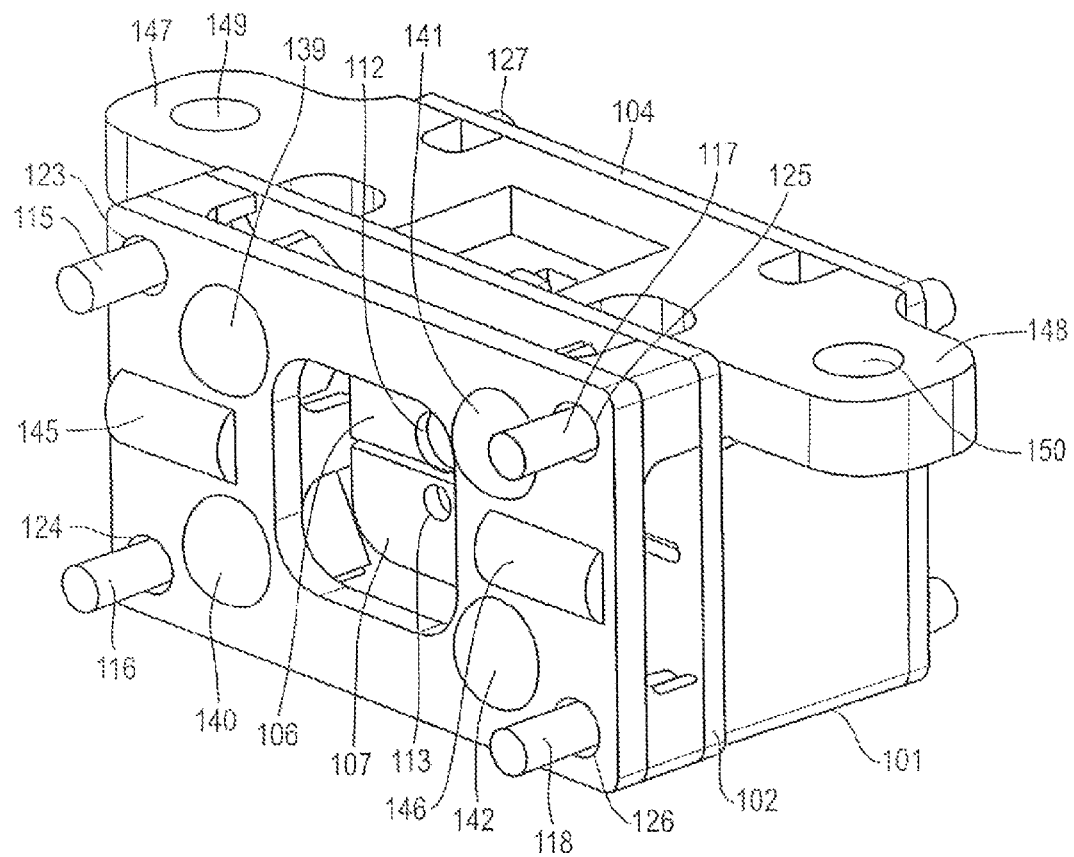
FIG. 5 is a perspective view of the imaging engine after it has been assembled.
FIG. 6 is a front view of the illumination board from the imaging engine.

FIG. 5 is a perspective view of the imaging engine 100 after it has been assembled. In this figure, the image sensor board 104, the illumination board 102, and the illumination/targeting lens structure 103 have been attached to the optics barrel 101. The support posts 115, 116, 117, 118 of the optics barrel 101 have been inserted through the holes 119, 120, 121, 122 in the illumination board 102 and the holes 123, 124, 125, 126 in the illumination/targeting lens structure 103. The support posts 127, 128, 129, 130 of the optics barrel 101 have been inserted through the holes 131, 132, 133, 134 in the image sensor board 104. The first lens carriage 106 (including its aperture 112) and the second lens carriage 107 (including its aperture 113) are shown positioned in the optics barrel 101. The front face of the illumination/targeting lens structure 103 is shown, including the lenses 139, 140, 141, 142 that focus the illumination from the LEDs 135, 136, 137, 138 onto the target area and the targeting lenses 145, 146 that focus the light from the targeting light sources 143, 144 onto the target area. The mounting brackets 147, 148 on the optics barrel 101 (including the mounting holes 149, 150) are also shown in FIG. 5.

FIG. 6 is a front view of the illumination board 102. The holes 119, 120, 121, 122 through which the support posts 115, 116, 117, 118 on the optics barrel 101 may be inserted are shown in FIG. 6. The LEDs 135, 136, 137, 138 that illuminate the target area are also shown. The apertures 163, 164 that permit light from the targeting light sources 143, 144 to pass through to the targeting lenses 145, 146 are also shown. The rectangular opening 165 that permits light to enter the first and second optical paths is also shown.

FIG. 7 is a front view of the image sensor board 104. The first section 105a and the second section 105b of the image sensor 105, the targeting light sources 143, 144, and the holes 131, 132, 133, 134 through which the support posts 127, 128, 129, 130 on the optics barrel 101 may be inserted are shown in FIG. 7.

As can be seen from the foregoing discussion, the structure 101 performs multiple functions. The structure 101 functions as an optics barrel 101. In other words, lenses 108, 109, 110, 111 are positioned within the structure 101 (via the lens carriages 106, 107). In addition, the structure 101 functions as an attachment/mounting apparatus for the image sensor board 104, the illumination board 102, and the illumination/targeting lens structure 103. In other words, the image sensor board 104, the illumination board 102, and the illumination/targeting lens structure 103 are each attached/mounted to the structure 101. Moreover, the structure 101 provides a mechanism for attaching/mounting the imaging engine 100 to another structure (e.g., the housing of a graphical code reader), via the mounting holes 149, 150. Thus, the structure 101 is a multifunctional structure 101.

The imaging engine 100 that has been described herein may be modified in a number of ways and yet remain within the scope of the claimed invention. Several examples of such modifications will now be described.

The imaging engine 100 that has been described herein includes two optical paths (and, therefore, two lens carriages 106, 107, one for each optical path). However, an imaging engine in accordance with the present disclosure may include more than two optical paths (and, therefore, more than two lens carriages).

The lens carriages 106, 107 in the imaging engine 100 that has been described herein are independently slidable within the optics barrel 101. However, instead of sliding the lens carriages 106, 107, other mechanisms may be provided for moving the lens carriages 106, 107. For example, screws may be utilized to move the lens carriages 106, 107.

In the imaging engine 100 that has been described herein, the first lens carriage 106 holds two lenses 108, 109, and the second lens carriage 107 also holds two lenses 110, 111. However, in an alternative imaging engine, the first and second lens carriages may both hold just a single lens, or they may both hold more than two lenses. Also, the first and second lens carriages may hold different numbers of lenses (e.g., the first lens carriage may hold a single lens, and the second lens carriage may hold multiple lenses).

In the imaging engine 100 that has been described herein, the baffle 114 that separates the first optical path from the second optical path is distinct from the lens carriages 106, 107. However, in an alternative imaging engine, at least one of the lens carriages may incorporate the baffle.

The imaging engine 100 that has been described herein includes a single image sensor 105 that is partitioned into two sections 105a, 105b (a first section 105a for the first optical path and a second section 105b for the second optical path). Alternatively, an imaging engine in accordance with the present disclosure may include multiple image sensors, where a first optical path corresponds to a first image sensor, a second optical path corresponds to a second image sensor, etc. In the claims that follow, the terms "first image sensor section" and "second image sensor section" may refer to different sections of the same image sensor, or to different image sensors.

Figure 8:
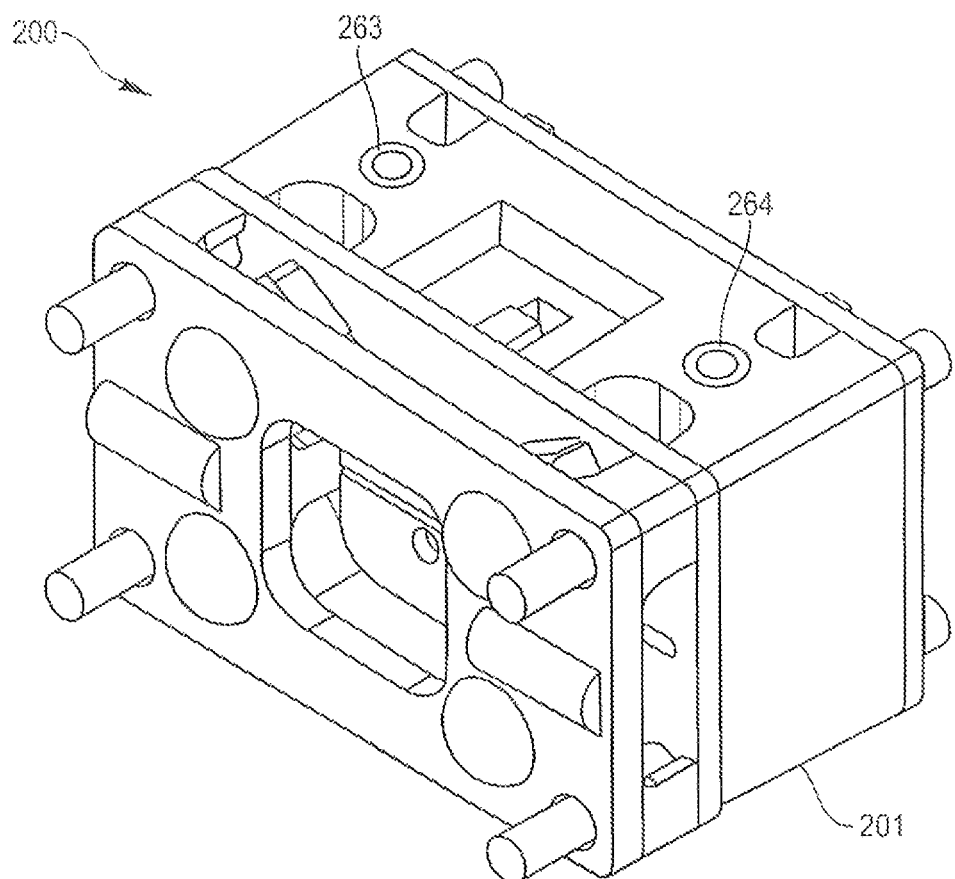
FIG. 8 is a perspective view of an alternative imaging engine.
Figure 9:
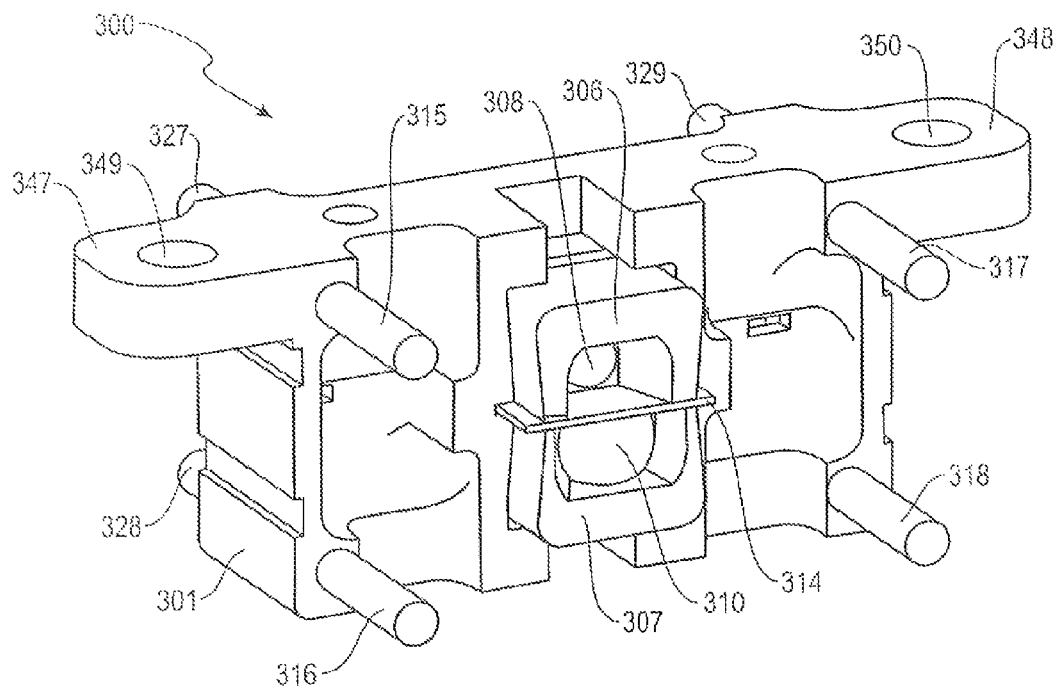
Figure 10:
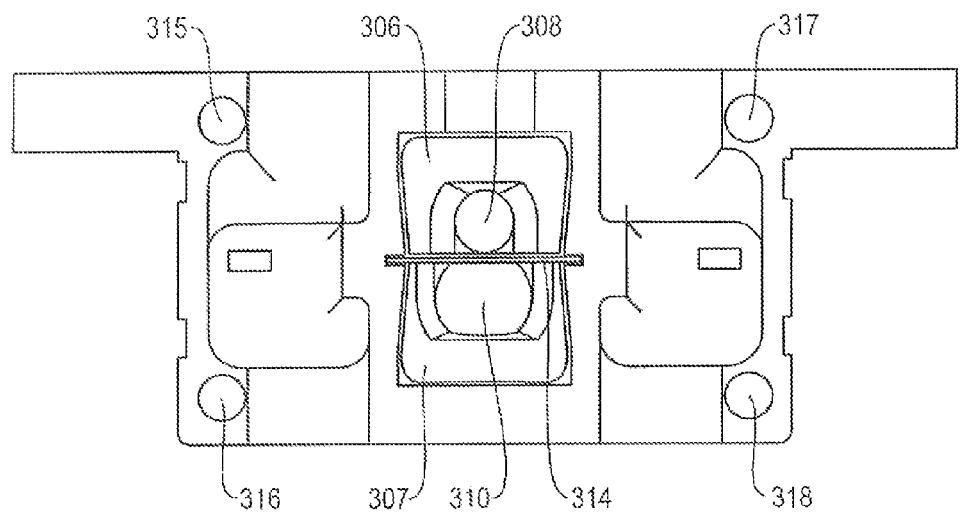
Figure 11:
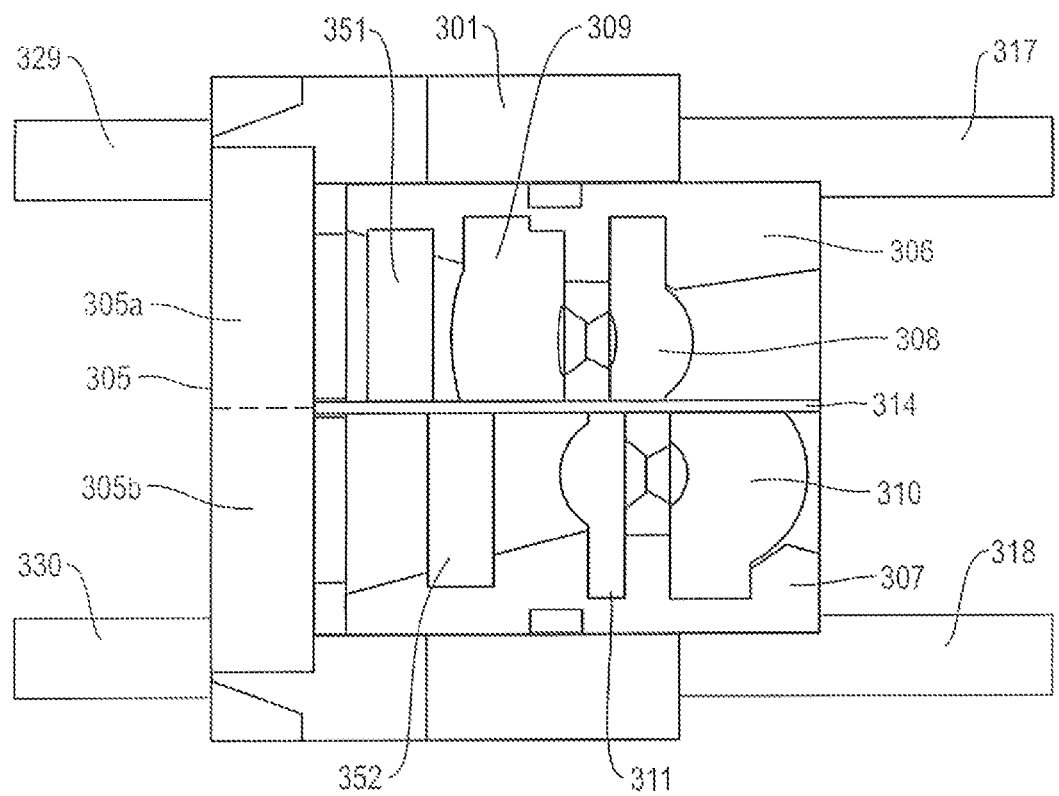
Figure 12:
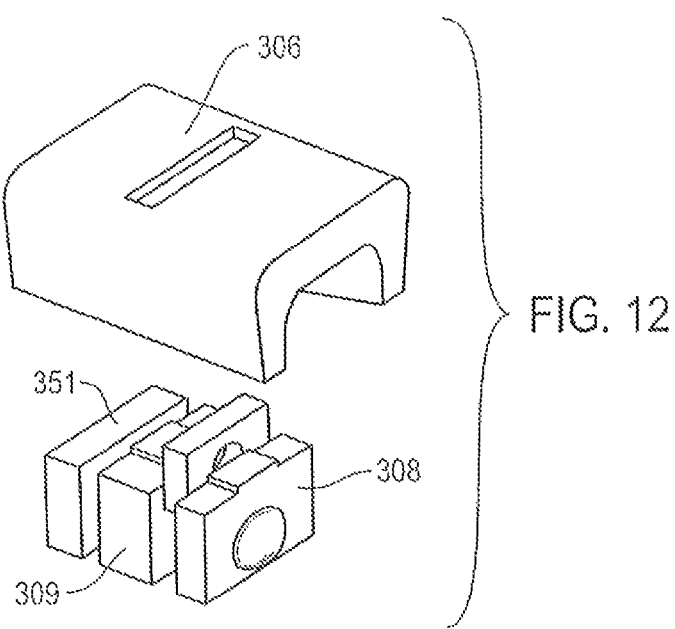

In the imaging engine 100 that has been described herein, the optics barrel 101 includes a pair of mounting tabs 147, 148 for attaching the imaging engine 100 to another structure. Alternatively, as shown in FIG. 8, an imaging engine 200 in accordance with the present disclosure may include an optics barrel 201 that does not include mounting tabs. Holes 263, 264 on the top surface of the optics barrel 201 may be used for attaching the imaging engine 200 to another structure.

In the imaging engine 100 that has been described herein, the illumination board 102 includes LEDs 135, 136, 137, 138. However, other kinds of light sources may be used instead of LEDs.

Other possible modifications may be made to the imaging engine 100, in addition to those specifically mentioned above. Such modifications include changes to the overall size and/or shape of the imaging engine 100, changes to the shape of the lens carriages 106, 107, etc. Also, as indicated above, a different mechanism for adjusting the position of the lens carriages 106, 107 may be utilized.

In the imaging engine 100 that has been described herein, the outer shape of the first lens carriage 106 is identical to the outer shape of the second lens carriage 107. Thus, each lens carriage 106, 107 may be positioned within either the upper portion of the rectangular cavity of the optics barrel 101 or the lower portion of the rectangular cavity of the optics barrel 101. For example, although the first lens carriage 106 has been described as being inserted into the upper portion of the rectangular cavity of the optics barrel 101, the first lens carriage 106 may be rotated 180° and inserted into the lower portion of the rectangular cavity of the optics barrel 101. Similarly, although the second lens carriage 107 has been described as being inserted into the lower portion of the rectangular cavity of the optics barrel 101, the second lens carriage 107 may be rotated 180° and inserted into the upper portion of the rectangular cavity of the optics barrel 101.

Thus, each lens carriage 106, 107 includes an outer portion that is shaped so that the lens carriage 106, 107 fits into at least two different locations within the imaging engine 100, namely: (1) the upper portion of the rectangular cavity of the optics barrel 101, and (2) the lower portion of the rectangular cavity of the optics barrel 101. In addition, each lens carriage 106, 107 includes an inner portion that includes at least one opening for a lens. More specifically, as described above, the lens carriage 107 includes openings 153, 154 for the wide-field far lens 110 and the wide-field near lens 111, respectively. The lens carriage 106 includes similar openings for the high-density far lens 108 and the high-density near lens 109.

The fact that each lens carriage 106, 107 may be positioned within either the upper portion of the rectangular cavity of the optics barrel 101 or the lower portion of the rectangular cavity of the optics barrel 101 is advantageous because it provides at least the following different configurations for the imaging engine 100: (1) a first configuration having a high-density optical path and a wide-field optical path, where the high-density optical path is located on top and the wide-field optical path is located on the bottom; (2) a second configuration also having a high-density optical path and a wide-field optical path, where the high-density optical path is located on the bottom and the wide-field optical path is located on the top; (3) a third configuration having two high-density optical paths; and (4) a fourth configuration having two wide-field optical paths. Of course, many additional configurations are also possible, because other optical prescriptions in addition to those described herein may also be used.

Different optical prescriptions may be used in each optical path (e.g., configurations (1) and (2)), or the same optical prescription may be used in each optical path (e.g., configurations (3) and (4)). Also, the lenses in different optical paths may have the same focal points or different focal points. In other words, the distance between the lenses and the image sensor could be the same for both optical paths, or it could be different. This is true even for configurations where the same optical prescription is being used in both optical paths. More specifically, even in a configuration where the same optical prescription is being used in both optical paths, the lenses in the upper portion of the optics barrel 101 and the lenses in the lower portion of the optics barrel 101 could be positioned so that they have the same focal points, or different focal points.

The outer shape of the lens carriages 106, 107 may be considered to define a standard "interface" for the optics barrel 101. In other words, additional lens carriages could be created with a variety of different optical prescriptions (including optical prescriptions that are different from those described herein), and as long as the outer shape of these additional lens carriages matches the outer shape of the lens carriages 106, 107 described herein, then these additional lens carriages could be used with the optics barrel 101 described herein.

An alternative imaging engine 300 is shown in FIGS. 9-14. Many components of the imaging engine 300 are similar to components of the imaging engine 100 that is shown in FIGS. 1-7. Similar components are labeled with similar reference numbers. For example, the optics barrel 301 in the imaging engine 300 is similar to the optics barrel 101 in the imaging engine 100. The lens carriages 306, 307 in the imaging engine 300 shown in FIGS. 9-14 are shaped differently than the lens carriages 106, 107 in the imaging engine 100 shown in FIGS. 1-7.

As used herein, the term "set" refers to a collection of one or more things. For example, a "set of lenses" may include a single lens, or multiple lenses.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An imaging engine, comprising:
 a first image sensor section;
 a second image sensor section;
 an optics barrel;
 a first lens carriage comprising at least one lens; and
 a second lens carriage comprising at least one lens;
 wherein the first lens carriage is positioned within the optics barrel so that there is a first optical path through the at least one lens in the first lens carriage to the first image sensor section;
 wherein the second lens carriage is positioned within the optics barrel so that there is a second optical path through the at least one lens in the second lens carriage to the second image sensor section; and
 wherein the position of the first lens carriage within the optics barrel and the position of the second lens carriage within the optics barrel are both independently adjustable.

2. The imaging engine of claim 1, wherein the first lens carriage and the second lens carriage are independently slidable within the optics barrel.

3. The imaging engine of claim 1, wherein the at least one lens in the first lens carriage and the at least one lens in the second lens carriage are fixed-focus lenses.

4. The imaging engine of claim 1, wherein each lens in the first lens carriage is keyed to a specific opening in the first lens carriage, and wherein each lens in the second lens carriage is keyed to a specific opening in the second lens carriage.

5. The imaging engine of claim 1, wherein the first lens carriage comprises a first aperture for allowing light to enter the first optical path, and wherein the second lens carriage comprises a second aperture for allowing light to enter the second optical path.

6. The imaging engine of claim 1, further comprising a baffle that separates the first optical path from the second optical path.

7. The imaging engine of claim 1, wherein:
the optics barrel comprises a rectangular cavity that is defined by an upper wall, a lower wall, a first side wall, and a second side wall;
the first side wall comprises a first groove and the second side wall comprises a second groove;
the first groove and the second groove are positioned at substantially the same height in the first and second side walls;
the first lens carriage is positioned in the rectangular cavity above the first groove and the second groove; and
the second lens carriage is positioned in the rectangular cavity below the first groove and the second groove.

8. The imaging engine of claim 7, wherein:
the upper wall comprises a first notch;
the first lens carriage comprises a first projection that fits within the first notch;
the lower wall comprises a second notch; and
the second lens carriage comprises a second projection that fits within the second notch.

9. The imaging engine of claim 1, wherein the optics barrel comprises mounting tabs for attaching the imaging engine to another structure.

10. The imaging engine of claim 1, further comprising an image sensor board attached to the optics barrel, wherein the image sensor board comprises the first image sensor section and the second image sensor section.

11. The imaging engine of claim 1, further comprising an illumination board attached to the optics barrel.

12. The imaging engine of claim 1, further comprising an illumination/targeting lens structure attached to the optics barrel.

13. The imaging engine of claim 1, further comprising:
a first filter positioned between the first lens carriage and the first image sensor section; and
a second filter positioned between the second lens carriage and the second image sensor section.

14. The imaging engine of claim 1, wherein an outer shape of the first lens carriage is identical to an outer shape of the second lens carriage.

15. An imaging engine, comprising:
a first image sensor section;
a second image sensor section;
an optics barrel;
a first lens carriage comprising at least one lens; and
a second lens carriage comprising at least one lens;
wherein the first lens carriage is positioned within the optics barrel in front of the first image sensor section;
wherein the second lens carriage is positioned within the optics barrel in front of the second image sensor section; and
wherein the distance between the first lens carriage and the first image sensor section is different than the distance between the second lens carriage and the second image sensor section.

16. A lens carriage, comprising:
an outer portion that is shaped so that the lens carriage fits into at least a first location and a second location within an optics barrel of an imaging engine; and
an inner portion that comprises at least one opening for at least one lens;
wherein there is a first optical path through the at least one lens to a first image sensor section when the lens carriage is positioned in the first location within the optics barrel of the imaging engine; and
wherein there is a second optical path through the at least one lens to a second image sensor section when the lens carriage is positioned in the second location within the optics barrel of the imaging engine.

* * * * *